United States Patent [19]

Moyer

[11] 3,993,726
[45] Nov. 23, 1976

[54] METHODS OF MAKING CONTINUOUS LENGTH REINFORCED PLASTIC ARTICLES

[75] Inventor: Richard L. Moyer, Newark, Del.

[73] Assignee: Hercules Incorporated, Wilmington, Del.

[22] Filed: Jan. 16, 1974

[21] Appl. No.: 433,983

[52] U.S. Cl. .............................. 264/174; 264/151; 264/209; 264/210 F; 264/280; 264/299; 264/323
[51] Int. Cl.² ...................................... D01D 13/06
[58] Field of Search .............. 264/174, 209, 210 F, 264/178, 151, 323, 299, 280; 161/177, 178; 156/180

[56] References Cited

UNITED STATES PATENTS

| | | | |
|---|---|---|---|
| 2,287,830 | 6/1942 | Postlewaite | 264/178 R |
| 2,721,599 | 10/1955 | De Vanter | 264/174 |
| 2,721,820 | 10/1955 | Von Reis et al. | 264/174 |
| 2,751,320 | 6/1956 | Jacobs et al. | 264/174 |
| 2,820,252 | 1/1958 | Koch | 264/178 F |
| 2,867,848 | 1/1959 | McGlamery | 264/174 |
| 3,039,142 | 6/1962 | Zavasnik | 264/210 R |
| 3,042,570 | 7/1962 | Bradt | 264/174 |
| 3,485,912 | 12/1969 | Schrenk et al. | 161/175 |
| 3,556,635 | 1/1971 | Schrenk et al. | 161/175 |
| 3,728,424 | 4/1973 | Bauer | 264/174 |
| 3,729,539 | 4/1973 | Hill | 264/174 |

FOREIGN PATENTS OR APPLICATIONS 38-18582 9/1963 Japan ............................ 264/174

*Primary Examiner*—Jay H. Woo
*Attorney, Agent, or Firm*—Stanley A. Becker

[57] ABSTRACT

Methods of making continuous length articles of reinforced plastic material includes passing rovings of temperature resistant material through a crosshead extruder to impregnate the rovings with a thermoplastic polymer under high pressure. The impregnated rovings are pulled from the extruder through a die and are cooled and shaped into a void free article having a desired cross-sectional shape.

7 Claims, 6 Drawing Figures

METHODS OF MAKING CONTINUOUS LENGTH REINFORCED PLASTIC ARTICLES

This invention relates to new and improved methods for making continuous lengths of plastic material which are reinforced with glass, graphite or other temperature resistant continuous filament fibers or reinforcing material. More particularly, this invention relates to methods of extrusion impregnation and pultrusion of a reinforced plastic material and forming continuous lengths of reinforced plastic material into rods, tubes or other desired shapes.

Heretofore, reinforced thermosetting plastics have been manufactured using conventional pultrusion methods wherein resin-coated fibers are pulled through a converging heated die to form solid rods, tubes or other shapes. However, in such cases high pulling forces are required to move the article through the die even when low viscosity thermosetting resins are used. Thus, these methods are limited to the use of high strength filaments. Furthermore, the pultruded article must be gripped in some way to transmit the pulling force to the article being pulled through the die. Some articles, such as a thin wall tube, do not have sufficient strength to permit them to be gripped tightly enough to pull them through such a die. Additionally, processing rates are generally quite slow, being in the range of 2 to 10 ft. per minute, due to the need to cure the thermosetting polymer and to the fact that the pulling force required increases rapidly with increasing speed and increasing viscosity of the resin.

Due to the much higher viscosities of thermoplastic resins, standard pultrusion dies and techniques cannot be utilized except under extremely high pulling forces, and even then only at very slow speeds. U.S. Pat. No. 3,470,051 discloses the use of a thermoplastic emulsion coated roving and pultrusion equipment. In addition to being relatively slow, this method also requires a drying step which further reduces its effectiveness.

Other prior art methods for preparing thermoplastic rods or tubes reinforced with glass or other fibers have deficiencies which limit the quality of the products produced or the speed of the preparation. For example, U.S. Pat. No. 3,042,570 describes apparatus and a method for preparing pellets of thermoplastic resins reinforced with glass fibers and involves passing continuous lengths of glass roving or strands into an impregnating bath of molten polymer, removing the impregnated strand bundles through various orifices, cooling the bundles, and then cutting them into lengths suitable for use in injection molding. The equipment is designed to coat the impregnated fiber bundle with a significant amount of polymer so that there is a relatively low fiber content by weight in the final product. Furthermore, the pressure on the impregnating bath is a very low pressure obtained by forcing solid plastic pellets into a melt bath using a feed screw. U.S. Pat. No. 2,877,501 describes a similar method of making glass reinforced thermoplastic injection molding pellets having a glass fiber content of 15–60% by weight. Among the deficiencies of these prior art methods is that the impregnation is often not complete or uniform because of the low pressures in the bath or chamber in which the molten polymer is kept, and that relatively high pulling forces are necessary to pull the impregnated roving through the sizing dies. Furthermore, high fiber contents cannot be obtained.

SUMMARY OF THE INVENTION

The subject invention relates to methods of making reinforced plastic continuous length members by passing one or more rovings of glass or other temperature resistant fibers through a crosshead extruder to extrude and impregnate the fibers with the thermoplastic polymer. The extruder forces the polymer into the crosshead die at a temperature and pressure sufficiently high that essentially complete impregnation of the rovings is obtained. The die may contain baffles or guides to open the roving bundles and facilitate impregnation. The die for the plastic impregnated rovings may have any cross-sectional shape desired in the final article, or a number of extrusion impregnated rovings may be combined after passing through separate dies and formed into the desired article. Upon exiting from the extrusion die, the impregnated reinforced article then passes into a cooling bath or other cooling device and through a sizing die or about a mandrel mounted therein to compress and shape the article and form it into a smooth, dense uniform rod or tube or other shape. The compressing of the shaped article during cooling inhibits formation of internal voids which have a tendency to form because the interior of the article on cooling has a tendency to shrink away from the initially hardened surface.

The extrusion impregnation is significant in many ways. It allows impregnation of the strands with high pressures (up to 7500 p.s.i.) thereby insuring excellent consolidation in the structure. It provides polymer flow in the direction the product moves thereby decreasing the force required to pull the product through the die. It provides for more rapid and effective heat transfer than can be accomplished in a conventional pultrusion die. It eliminates any need for subsequent removal of solvent or water from the product. Furthermore, the extruder delivers as much polymer as is required to fill the die at all times so that a uniformly dimensioned product is obtained. Additionally, it allows manufacture of products having a high percentage of strand in the composition of the product.

Other advantages of the present invention will be apparent from the following detailed drawings, which drawings form a part of the specification. It is to be noted, however, that the drawings illustrate only typical embodiments of the invention and are therefore not to be considered limiting in scope for the invention may admit to other equally effective embodiments.

BRIEF DISCUSSION OF THE DRAWINGS

DESCRIPTION OF THE INVENTION

Figure 1:
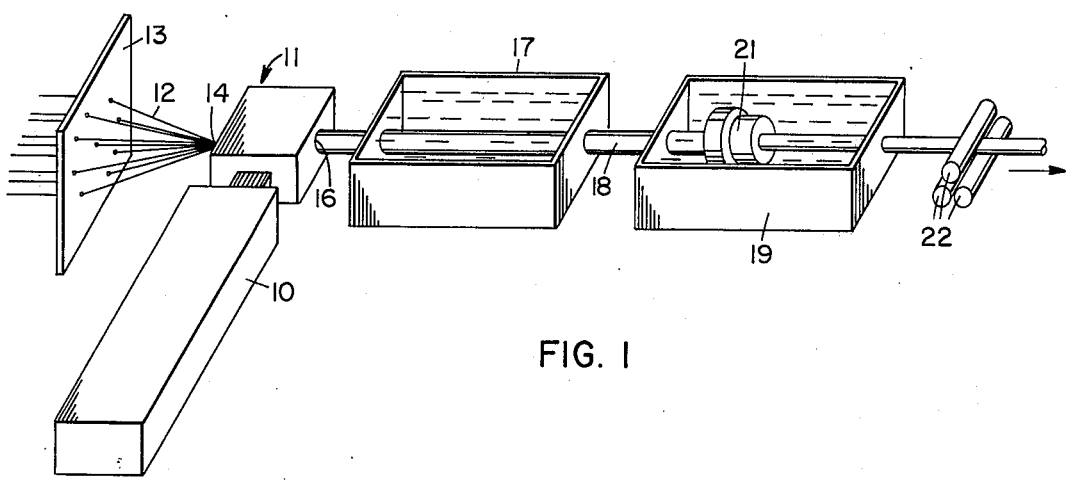
FIG. 1 is a schematic representation of the apparatus employed to make continuous length reinforced plastic products in accordance with the principles of this invention.

Referring to FIG. 1, there is shown an extruder generally designated as 10 having a crosshead die 11 through which a plurality of rovings 12 are advanced from a creel or storage device 13. The rovings 12 may be glass or graphite fiber, or any other temperature resistant filamentary material, and the term "rovings" is meant to encompass groups of fibers or filaments, either twisted or untwisted, or filamentary type tape, or any other bundles of continuous length reinforcing material in any shape that can be utilized in the subject invention. The rovings 12 may be pretreated by any appropriate means to improve the adhesion to the polymeric material used. Examples of pretreatment include burning off any size present on the rovings, treating the rovings with materials which serve as coupling agents to bond the polymer to the rovings, or preheating the rovings. Alternatively, coupling agents may be incorporated in the extruded polymer composition.

The rovings 12 are advanced into multiple inlet orifices 14 of the crosshead die 11 and are impregnated by the hot polymer within the die. The crosshead die 11 is fed with molten polymer under pressure by the plastic extruder 10. If desired, a metering pump (not shown) may be employed between the extruder 10 and the crosshead die 11. The impregnated rovings emerge from the exit die orifie 16 where they are shaped, as shown in FIG. 1, into a rod 18. The relatively high pressure (up to 7500 p.s.i.) within the crosshead die 11 forces the impregnated rovings through the exit orifice 16 so that less pulling force is required than in a conventional pultrusion process. This also allows for relatively high production speed. Furthermore, products can be made wherein the rovings comprise between about 30 and 90% by weight of the product.

Figure 2:
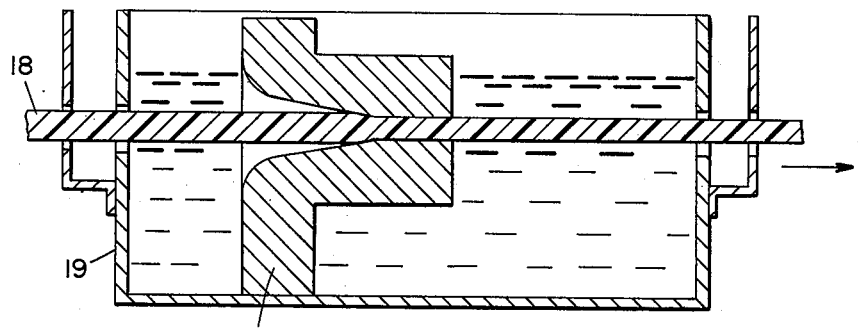
FIG. 2 is an enlaged cross-sectional view of the sizing die and cooling bath shown in FIG. 1.

From the extrusion die 11 the rod 18 is passed into a first cooling bath 17, the purpose of which is to harden the outside surface of the article or rod 18 prior to its passing through a sizing and shaping device. The cooled rod 18 then passes from the cooling bath 17 into a second cooling bath 19 which has a sizing die 21 (also see FIG. 2) located therein having a tapered hole therein slightly smaller than the initial diameter of the rod. When the rod 18 is passed through the cooling baths, there is a tendency for voids to form on the inside thereof because the interior of the rod has a tendency to shrink away from the initially hardened outer surface. To avoid this, the sizing die 21 is utilized to compress and further shape the article to provide a smooth, uniform, dense, void-free cross-section. The type of equipment used for applying pressure to the plastic impregnated rovings during cooling will depend upon the shape being prepared. A rod or other compact solid article may be passed through a die of a shape corresponding to that of the exit orifice of the crosshead die to exert pressure on the article while it is being cooled. A tube or pipe could be pulled over an internal mandrel to provide such pressure. Flat sheets and tapes can be passed between cooled pressure rollers for the same purpose. The sizing and shaping device may be a die or mandrel or both of substantially the same shape as that of the exit of the crosshead die and of a size adjusted to compensate for the size reduction of the article on cooling. The shaped article may, before application of pressure, be passed through an initial cooling path sufficient in length and cooling capacity to solidify the surfaces so they will not be tacky when passing through the sizing and shaping device. Of course, one long cooling bath may be utilized, if desired, instead of several baths such as 17 and 19. As the rod passes through the sizing die 21, it is desirable to cool it to a temperature below the crystallization or melting point of the polymer so that no further voids will develop upon further cooling, and so it can be handled by the pulling facilities without deformation. The crystallization and melting point of a polymer are usually the same, but in instances where they differ, the article should desirably be cooled to a temperature below the crystallization point. The continuous cooling and shaping operations can be carried out at a high linear rate. The rod 18 is pulled through the dies 11 and 21 by pulling rolls 22, or any other pulling facilities such as a pair of continuous caterpillar belts, and is then cut into lengths or wound on a drum. Rolls 22 exert the pulling forces necessary to pull the impregnated strands through the exit die orifice 16 of crosshead die 11 and through the cooling baths 17 and 19 and the sizing and shaping device 21.

Figure 3:
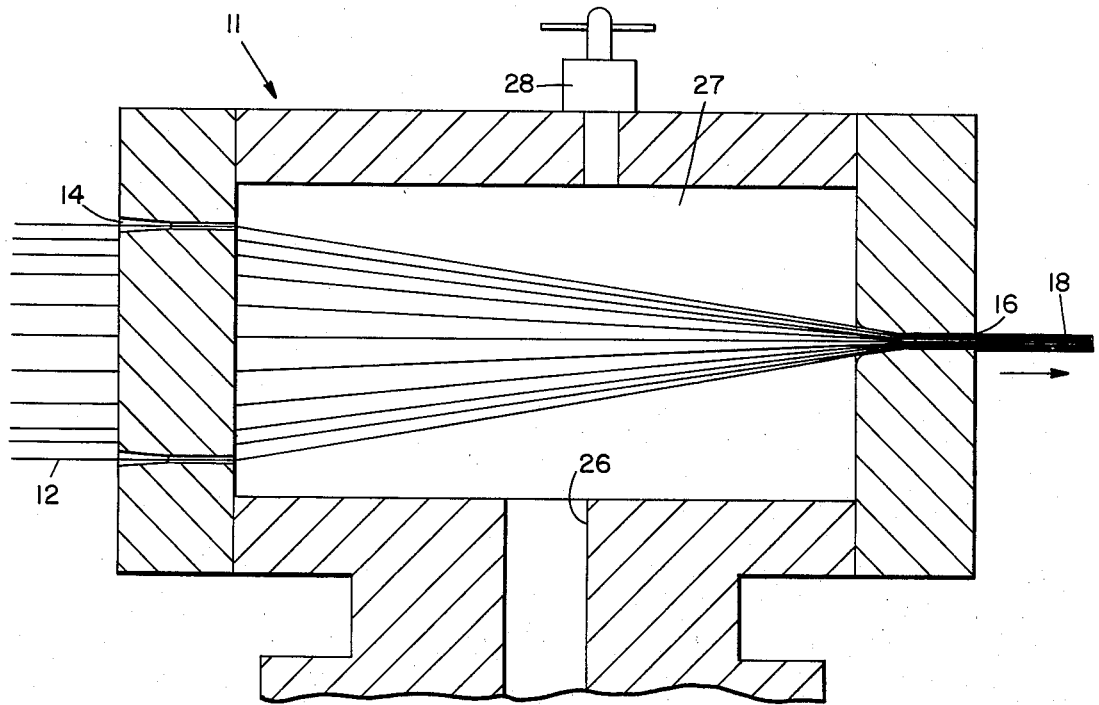
FIG. 3 is an enlarged cross-sectional view of a crosshead extrusion die which may be employed for impregnating a plurality of rovings.

Referring now to FIG. 3, there is shown an enlarged cross-sectional view of the crosshead die 11 of FIG. 1. The rovings 12 enter the die 11 through separate orifices 14 each of which is tapered and is only slightly larger at its smallest diameter than the size of the rovings 12 to prevent leakage of the polymer out of the orifices 14. Polymer is introduced from the extruder 10 through polymer inlet 26 into a pressure chamber 27 of die 11. The rovings 12 pass through the pressure chamber 27 where they are impregnated by the polymer under high pressure. The rovings then pass through the exit die orifice 16 which is a relatively long, tapered orifice designed to shape and compress the impregnated rovings into a desired shape, such as a rod 18 as shown, and to prevent an excess of polymer from being removed from the die. The orifice may be of any cross-sectional shape desired.

A control or bleed valve 28 may be positioned to communicate with the chamber 27 to allow controlled removal of excess polymer from the die. This is of particular value during start-up of the extruder 10 to assist in maintaining a uniform pressure within the die. Thus, polymer flow from the extruder 10 into the crosshead die 11 may be initiated by opening the control valve 28 even before the rovings 12 are pulled through the die. Accordingly, molten polymer can be present in the chamber 27 prior to initiating pulling of the rovings to lubricate the rovings. This prevents breakage of the rovings and possible damage to the die orifice 16 which may occur because of excessive friction between non-lubricated rovings and the die surface as the extruder starts up. After the rovings advancement has increased to the desired rate, the control valve 28 can be gradually closed to maintain a constant pressure in the crosshead die 11, with the desired proportion of polymer to rovings in the exiting impregnated rovings. Thus, the metering valve 28 assists in regulating the flow of melted polymer in relation to the rate of pull-through of the rovings through the die 11. If desired, baffle pins (not shown) may be placed in the chamber 27 to spread the rovings 12 farther apart and improve the degree of wetting and penetration of the rovings by the polymer.

Figure 4:
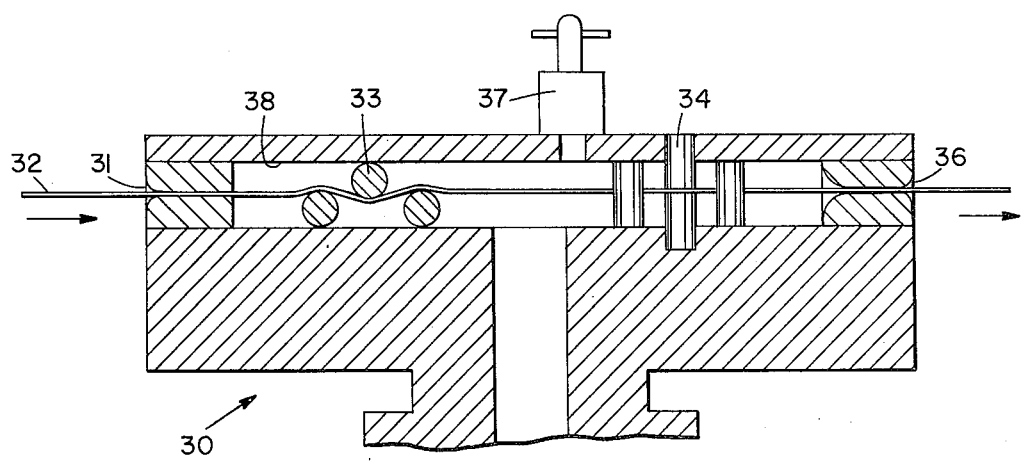
FIG. 4 is an enlarged cross-sectional view of another crosshead extrusion die for impregnating rovings and which includes baffle pins to facilitate impregnation.

Referring to FIG. 4, there is shown another die 30, having an inlet 31 into which one or more rovings 32 are advanced. A plurality of baffle pins 33 are positioned to flatten the rovings in one direction to separate the individual filaments from each other to obtain complete impregnation of the rovings. Another set of baffle pins 34 are mounted in another direction to flatten other sides of the rovings, again separating the individual filaments to obtain complete impregnation of the rovings before it passes out of the exit die 36. The pins may be bowed in shape to increase the separation of the filaments. A control valve 37 is provided in communication with the chamber 38 of the die 30 as described similarly with respect to FIG. 3.

Figure 5:
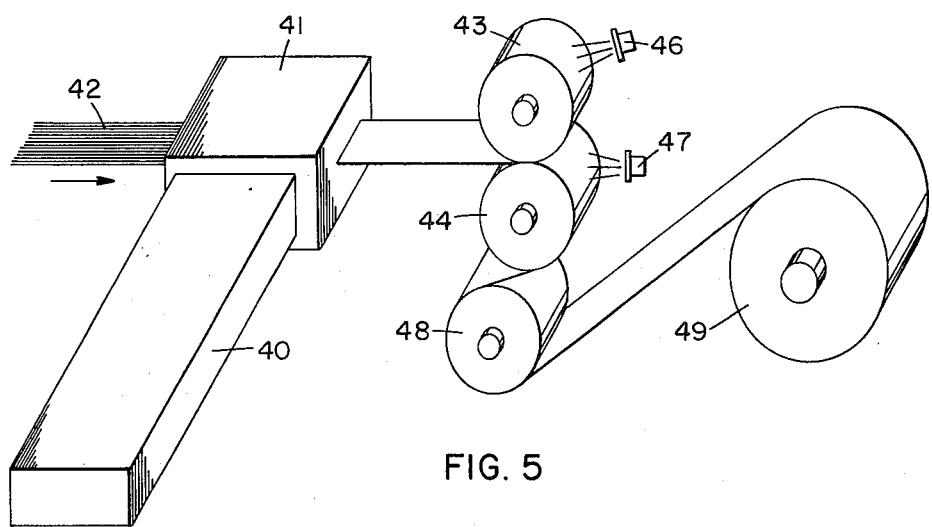
FIG. 5 is a schematic representation of apparatus for forming filament reinforced tape in accordance with the principles of this invention.

Referring to FIG. 5, there is shown apparatus for the fabrication of reinforced plastic tape. The apparatus includes an extruder 40 having a crosshead die 41 into which a plurality of parallel rovings 42 passes. The rovings are impregnated with polymer and after exiting from the die through a single slit or a plurality of holes advance between two pressure rolls 43 and 44, which are cooled by water sprays 46 and 47, respectively. It may be advantageous for the impregnated rovings to exit through a plurality of closely spaced holes in die 41 instead of through a slit. In this instance the rovings would not be consolidated into a tape until they pass between the nip of rolls 43 and 44. Thus, tapes of various widths could be formed without cutting by inserting some separating device, such as rods or pins, into the path of travel of the impregnated rovings before they advance into the nip of rolls 43 and 44. The pressure rolls 43 and 44 function both to pull the impregnated rovings from the die 41 and to compress and shape the tape 48 which is formed. The tape 48 is then wound on a take-up reel 49. Such a tape is particularly useful for the preparation of pipe by a spiral winding operation.

Figure 6:
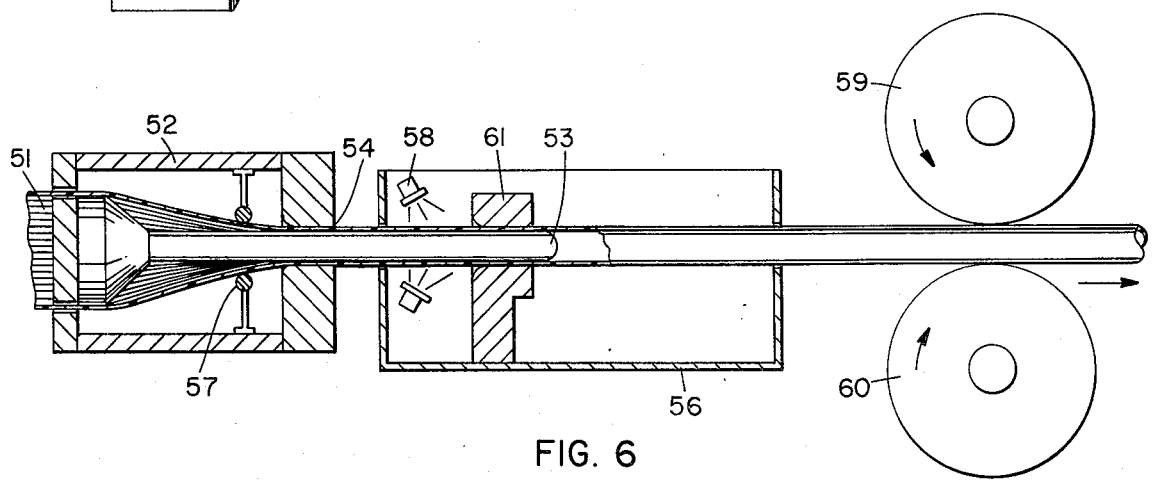
FIG. 6 is a schematic representation of apparatus for forming pipe in accordance with the principles of this invention.

Referring to FIG. 6, there is shown apparatus for the extrusion pultrusion of tubes or pipes. The apparatus includes a plurality of rovings 51 which are advanced into a crosshead die 52. A mandrel 53 extends from a position interior of the crosshead die 52 through the exit die 54 and to a position within a cooling bath 56. A gathering ring 57 is positioned within the crosshead die 52 to gather the rovings 51 together into substantially the proper shape prior to exiting from the exit die orifice 54. A water spray 58 may be positioned to insure complete and uniform cooling of the tube 55 as it passes from the crosshead die into the cooling bath. A sizing die 61 is positioned in the bath 56 to size and compress the tube about mandrel 53 to remove all voids therefrom. While the tube 55 could be immersed in the bath, if the tube has thin walls the water sprays 58 usually are sufficient to cool and harden the outer surface. Pipe pulling rolls 59 and 60 pull the tube or pipe through the apparatus. By utilization of the extrusion impregnation process, it is possible to exert sufficient force on the pipe by rolls 59 and 60 to pull it through the apparatus without collapsing the pipe or tube therebetween. Such tubing or pipe containing a high proportion of linearly oriented reinforcing rovings can subsequently have rovings or plastic impregnated tape overwound about its periphery to increase its burst strength.

It is to be understood that any types of rovings may be utilized in the subject invention, including without limitation, rovings of glass fibers or graphite or other temperature resistant continuous filament fibers. Furthermore, any cross-sectional shaped articles, solid or hollow, that are desired may be made. Additionally, if desired, the resulting product could be chopped or cut into short lengths for other purposes, such as for use in injection molding, for example.

The principles of this invention are exemplified by the following examples, which are given to illustrate the invention and are not to be considered limiting in any way.

EXAMPLE 1

A fiberglass roving (Type K836AA) consisting of about 2030 continuous filaments, each about 12 microns in diameter, was pulled through a crosshead die into which polypropylene containing 1.3% polypropylene-maleic anhydride adduct and 2.5% Monarch carbon black at about 100 p.s.i. and 300° C. was introduced using a plastic melt extruder with a 1 inch screw and a 20:1 length to diameter ratio. The crosshead die consisted of a standard 1 inch high pressure tubing to which were attached steel plugs containing inlet and exit orifices for the roving. The inlet orifice was 0.50 inch long, tapered so that it was 0.1 inch in diameter on the outside of the plug and 0.046 inch in diameter on the inside. The exit orifice was also tapered over its 0.50 inch length, being 0.1 inch in diameter on the inside and 0.043 inch in diameter on the outside of the plug. A control valve was attached to the die, which allowed polymer to be removed from the die to maintain a constant pressure within the die, and to permit regulation of the proportion of the polymer to glass fibers in the impregnated roving leaving the die. The roving passed through the crosshead die at a linear speed of 309 ft./min.

The roving impregnated with molten polymer leaving the die was passed between two steel rolls 4 inches in diameter which were pressed together with a force of about 200 pounds. The rolls were sprayed with cold water. The pressure of the rolls served to convert the impregnated roving into a ribbon 0.1 inch wide and 0.015 inch thick. This ribbon was collected on a package using a precision winder. It contained 27% polypropylene by weight and had a tensile strength of 200,000 p.s.i., a flexural strength of 23,300 p.s.i. and a flexural modulus of 1,145,000 p.s.i. It was subsequently used successfully for the preparation of strong pipe by filament winding.

EXAMPLE 2

The crosshead die of Example 1 was replaced with one containing 14 entrance and 14 exit holes of the same size and designs as those in Example 1, the exit holes being in a horizontal plane and separated 0.1 inch from each other. In addition, six baffle pins or rods were incorporated into the die over which the rovings would pass and become flattened, thus assisting the impregnation of the molten polymer into the rovings. Fourteen fiberglass rovings of the same size and type as used in Example 1 were preheated to about 120° C. and pulled through the crosshead die at the rate of 109 ft./min. Polypropylene polymer containing 1.1% polypropylene-maleic anhydride adduct as a wetting and adhesion agent was fed into the crosshead die at a pressure of 300 p.s.i. at 210° C. On leaving the die holes, the 14 impregnated rovings were pulled in close alignment between rolls 4-½ inches in diameter pressed together with a force of about 200 pounds. Because of the proximity of the rovings which were impregnated with molten polymer, they become attached to each other between the die and the rolls to form a tape. The rolls were cooled with a spray of water. The tape emerging from the rolls was 1 inch wide and 0.015 inch thick, was void-free and contained 39.8% polypropylene. The tape was used to filament wind a pipe 2.6 in. in diameter with a 0.125 in. wall thickness by filament winding at an angle of 65° to the longitudinal axis in a helical pattern. The tape was preheated, and the mandrel on which the pipe was wound was heated to 204° C. to effect bonding of the tapes by partial melting of the polypropylene polymer. The pipe so produced had an estimated burst pressure of 2600 psi.

EXAMPLE 3

The crosshead die of Example 2 with 14 inlet orifices was used under similar impregnation conditions. The exit orifice was a tapered hole in a steel plug 1 inch long, 0.125 inch in diameter at the outside and 0.4 inch in diameter on the inside of the die. The rod-shaped bundle of rovings emerging from the exit orifice was passed at a speed of 20 ft./min. into a water bath and through a sizing die consisting of a shaped hole in a steel rod mounted in the water bath. The hole was 3/4 inch long, 0.12 inch in diameter at the exit with a rounded entrance. This produced a rod that was dense, void-free, and had a smooth surface. It contained 20.6% polymer. It was considerably stronger than a similar rod made without use of the sizing die in the cooling bath.

EXAMPLE 4

A crosshead die capable of accommodating 120 fiberglass rovings was used to impregnate this number of rovings. The inlet orifices were of the design used in Examples 1 2. The outlet orifice was a tapered hole in a steel plug 1 inch thick, the diameter of the hole on the inside of the die being 0.65 inch and on the exit side being 0.38 inch. A gathering ring inside the die 1 inch from the exit orifice served to consolidate the rovings into a circular form while allowing effective impregnation of the rovings with molten polymer. The rovings (Type 836AA) were pulled pulled through the die at a speed of 30 ft./min. An extruder with 60 mm. diameter was used to supply polypropylene to the cross-head die at a pressure of 500 p.s.i. and at a temperature of 300° C.

The impregnated rod-shaped bundle of fibers leaving the die was passed into a water bath as in Example 3 and through a sizing die with an exit hole size of 0.375 inch. The rod produced contained 20.2% polypropylene, had a smooth surface, was void-free and had a flexural strength of 17,800 p.s.i.

EXAMPLE 5

The extruder used in Example 4 was fitted with a cross-head die containing 80 tapered entrance holes of the design used in Example 1, but with a tapered annular exit hole with an inside diameter of 0.704 inch and an outside diameter of 0.828 inch at the exit side. Attached to the inside of the exit die was a rod which extended into the water bath on the end of which was a torpedo-shaped mandrel, which served to prevent shrinkage and to shape the tubular polymer-impregnated fiber bundle.

Eighty glass rovings were passed through the die at a rate of 14 ft./min., the polypropylene polymer temperature being 305° C. and the pressure being 400 p.s.i. Void free pipe with a smooth surface was prepared by this process. It contained 30% polypropylene. This pipe could subsequently be overwound with a double helical layer of heated polypropylene impregnated glass roving as prepared in Example 1.

EXAMPLE 6

A graphite fiber tow containing 10,000 filaments, each about 0.3 mil in diameter, was pulled through a crosshead die with inlet and exit orifices of the same size and shape as the exit orifice used in Example 3 and containing rods to spread the tow as in Example 2. The die was fed with polypropylene polymer containing 1.1% polypropylene-maleic anhydride adduct at a temperature of 300° C. and 150 p.s.i. pressure using the plastic extruder employed in Example 1. The fiber tow was preheated by passing it through an air tunnel heated to 275° C. prior to entering the crosshead die. The linear speed of the fiber tow was 15 ft./min. The impregnated tow was cooled under pressure between two steel rolls as in Example 1. The fiber reinforced plastic ribbon so produced contained 41% polypropylene and had a tensile strength of 100,000 p.s.i.

EXAMPLE 7

A Type A graphite fiber tow (Hercules) containing 10,000 continous filaments each about 0.3 mil in diameter was impregnated with nylon 66 using the equipment of Example 6. The preheating temperature was 235° C., and the crosshead die temperature and pressure were 290° C. and 1100 p.s.i., respectively. The linear speed of the tow through the die was 36 ft./min. The flattened fiber reinforced plastic rod produced contained 25% nylon plastic.

EXAMPLE 8

Example 7 was repeated except using an exit orifice which was rectangular in shape. The nylon-impregnated graphite reinfirced rod so produced was rectangular in shape and about 1/8 inch wide and 1/16 inch thick.

What I claim and desire to protect by Letters Patent is:

1. A method of making reinforced plastic articles comprising:
    advancing one or more continuous length rovings of temperature resistant material into a crosshead extruder die;
    forcing molten polymer into said die under relatively high pressure to impregnate said rovings; cross-section;
    continuously extruding and pulling said impregnated rovings through one or more exit orifices of said die to consolidate and shape said impregnated rovings into an article having a substantially uniform cross-section:
    at least partially cooling said article to harden the outer surface thereof; and
    compressing said article during cooling to remove voids therein and provide a uniform cross-section wherein said rovings comprise between about 30% to 90% by weight of said article.

2. A method of making reinforced plastic articles as set forth in claim 1 including cooling the article during the compressing step to a temperature below the crystallization point of the polymer.

3. A method of making reinforced plastic articles as set forth in claim 1 wherein baffles are provided in said die to separate the rovings to increase impregnation thereof.

4. A method of making reinforced plastic articles as set forth in claim 1 wherein said rovings comprise between about 30–90% by weight of said article.

5. A method of making reinforced plastic articles as set forth in claim 1 wherein said rovings are advanced into and through said crosshead extruder die in a flat planar array.

6. A method of making reinforced plastic articles as set forth in claim 5 wherein the flat article formed is separated into a plurality of tapes.

7. A method of making reinforced plastic articles as set forth in claim 1 wherein said rovings are advanced into said crosshead extruder die in a tubular array and are formed about a mandrel into a pipe.

* * * * *

UNITED STATES PATENT AND TRADEMARK OFFICE
CERTIFICATE OF CORRECTION

PATENT NO. : 3,993,726
DATED : November 23, 1976
INVENTOR(S) : Richard L. Moyer

It is certified that error appears in the above–identified patent and that said Letters Patent are hereby corrected as shown below:

Col. 7, Line 30
  "Example 1 2" -- should read -- " Example 1 and 2"

Col. 7, Line 38
  "pulled pulled through" -- should read -- "pulled through"

Col. 8, Line 45 & 46
  "cross-section;" -- should be deleted

Signed and Sealed this

Twenty-second Day of February 1977

[SEAL]

Attest:

RUTH C. MASON
*Attesting Officer*

C. MARSHALL DANN
*Commissioner of Patents and Trademarks*